United States Patent [19]

Nakamura et al.

[11] 4,419,971
[45] Dec. 13, 1983

[54] CYLINDER LINER FOR AN INTERNAL COMBUSTION ENGINE

[75] Inventors: Kiyoshi Nakamura; Katsutoshi Nishida, both of Yokohama; Toshihiko Ochiai, Yokosuka; Akio Ando, Kawasaki; Syoji Okada, Yokohama, all of Japan

[73] Assignee: Tokyo Shibaura Denki Kabushiki Kaisha, Kawasaki, Japan

[21] Appl. No.: 443,911

[22] Filed: Nov. 23, 1982

Related U.S. Application Data

[63] Continuation of Ser. No. 166,855, Jul. 8, 1980, abandoned.

[30] Foreign Application Priority Data

Nov. 21, 1979 [JP] Japan ................................ 54-149997

[51] Int. Cl.³ ................................................ F01F 1/18
[52] U.S. Cl. ................................ 123/193 C; 123/668; 428/36
[58] Field of Search ............... 123/193 R, 193 C, 668, 123/669; 60/323; 427/93, 94; 428/36, 450, 472

[56] References Cited

U.S. PATENT DOCUMENTS

| | | | |
|---|---|---|---|
| 1,835,971 | 12/1931 | Schattanek | 123/668 |
| 3,404,606 | 10/1968 | Papst | 92/169 |
| 3,657,078 | 4/1972 | Schweikher | 123/193 C |
| 3,903,951 | 9/1975 | Kaneko et al. | 123/193 C |
| 3,959,974 | 6/1976 | Thomas | 123/1 R |
| 4,068,645 | 1/1978 | Jenkinson | 123/193 C |
| 4,074,671 | 2/1978 | Pennila | 123/668 |
| 4,118,539 | 10/1978 | Hirai et al. | 428/36 |
| 4,150,182 | 4/1979 | Pignocco et al. | 428/36 |
| 4,248,752 | 2/1981 | Myles | 260/29.1 R |
| 4,341,826 | 7/1982 | Prewo et al. | 123/193 R |

FOREIGN PATENT DOCUMENTS

| | | | |
|---|---|---|---|
| 54-33911 | 3/1979 | Japan | 123/193 C |
| 643435 | 9/1950 | United Kingdom . | |
| 731271 | 6/1955 | United Kingdom . | |

*Primary Examiner*—Craig R. Feinberg
*Attorney, Agent, or Firm*—Oblon, Fisher, Spivak, McClelland & Maier

[57] ABSTRACT

A cylinder liner for use in an internal combustion engine which is formed of ceramic material having a density higher than 95% of theoretical value and a randomly directed and homogeneous structure. The ceramic liner is composed of silicon nitride, silicon carbide, an oxynitride such as silicon oxynitride and silicon aluminum oxynitride, silicon nitride-silicon carbide or aluminum nitride.

1 Claim, 2 Drawing Figures

CYLINDER LINER FOR AN INTERNAL COMBUSTION ENGINE

This is a continuation of application Ser. No. 166,855, filed July 8, 1980 now abandoned.

BACKGROUND OF THE INVENTION

1. Field of the Invention:

The present invention relates to a ceramic cylinder liner for an internal combustion engine.

2. Description of the Prior Art:

A combustion chamber for an internal combustion engine made of ceramic mass is illustrated on pages 915–916 of the publication entitled "CERAMICS FOR HIGH PERFORMANCE APPLICATIONS-II", published in 1978 by Brook Hill Publishing Company. However, it has been found to be necessary to improve the design of the cylinder liner disclosed in such publication with respect to it's resistance to mechanical stress, heat stress and wear.

SUMMARY OF THE INVENTION

Accordingly, it is an object of the present invention to provide a cylinder liner made of ceramic material or mass which exhibits good resistance to mechanical stress.

It is another object of the present invention to provide a cylinder liner made of ceramic mass which exhibits good resistance to heat stress.

It is another object of the present invention to provide a cylinder liner made of ceramic mass which exhibits good wear resistance.

These and other objects have now been attained in the present invention by providing a cylinder liner made of ceramic mass which is designed to have a density greater than 95% of theoretical value and a randomly directed and homogeneous structure.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

The cylinder liner for an internal combustion engine, of the present invention, is made of a ceramic mass designed to have a density greater than 95% of theoretical density value and have a randomly directed and homogeneous structure. The cylinder liner of the present invention is produced by furnace sintering to obtain the above-mentioned design.

Where a cylinder liner is produced by hot pressing, the pressure is applied in the axial direction of the cylinder liner. Therefore, the structure of the sintered body is arranged in a certain direction. Consequently, where nonuniform stress (for instance, caused by thermal insertion) acts upon the cylinder liner, the cylinder liner will be damaged. Additionally, where a generously sized cylinder liner is produced by hot pressing, in general, such has to be formed of composite ceramic articles. Therefore, it is difficult to obtain a homogeneous product.

Where a cylinder liner is produced by reaction sintering, it is necessary to provide spaces for gas passages in the molded mass until reaction completion. Therefore, the ceramic body produced by reaction sintering is of low density and low mechanical strength.

On the other hand, according to furnace sintering, a sintered body is formed by a process including molding by ceramic powder and sintering the molded mass. Consequently, the ceramic cylinder liner produced by furnace sintering has a randomly directed and homogeneous structure, homogeneous density and homogeneous mechanical strength. Therefore, such is not damaged by nonuniform stress. Additionally, where the ceramic cylinder liner is produced by furnace sintering, it is easy to have a density higher than 95% of theoretical value. It is also relatively easy to obtain a flexural strength greater than 50 kg/cm$^2$ at 800° C. where the ceramic cylinder liner is made of silicon nitride, silicon carbide, an oxynitride such as silicon oxynitride (Si$_2$ON$_2$) and silicon aluminum oxynitride (Si Al ON), silicon nitride-silicon carbide or aluminum nitride.

The value of the above-noted density and flexural strength accordingly are enough for a desirable cylinder liner.

EXAMPLE

Figure 1:
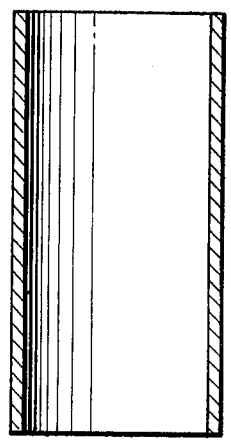
FIG. 1 is a sectional view of a cylinder liner according to the present invention.
Figure 2:
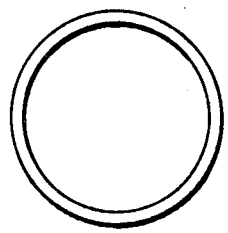
FIG. 2 is a top plan view of a cylinder liner according to the present invention.

A powdered mixture consisting of 88% by weight of silicon nitride, 5% by weight of yttrium oxide and 7% by weight of aluminum oxide, the mean particle size thereof being 1.5, 1.6 and 1.1 microns respectively, was prepared and added to 5% by weight of paraffin as a binder. The mixture was molded, the size thereof being 160 mm for the inner diameter; 172 mm for the outer diameter; and 350 mm in height, at a pressure of 1000 kg/cm$^2$. The molding was embedded in a packing of a silicon nitride powder in a carbon vessel and then placed in a furnace for sintering. The sintering was performed at a temperature of 1800° C. for 1 hour in an atmosphere of nitrogen gas. The inner surface of the sintered product was surface finished by grinding to provide a surface roughness of 1.0.S, where dimension "S" is used to indicate the surface roughness according to the Japanese Industrial Standard B0601. As a result, the cylinder liner as shown in FIGS. 1 and 2 was obtained.

The sintered ceramic body prepared by the same method of the above-mentioned process was cut and then test pieces were prepared. The density, the flexural strength at 800° C., the result of wear testing of the pin-flat method and the result of crack testing are shown in the Table set forth below.

TABLE

| | Density (% of the theoretical value) | Flexural Strength at 80° C. (kg/mm$^2$) | Specific wear rate[*1] [(mm/kg.mm) $\times 10^{-7}$] | Crack occurence rate[*2] (%) |
| --- | --- | --- | --- | --- |
| Example | 98 | 75 | 7.5 | 4 |
| Ref. 1[*3] | 99.8 | 65[*4] | 4.6 | 26 |

TABLE-continued

| | Density (% of the theoretical value) | Flexural Strength at 80° C. (kg/mm²) | Specific wear rate*1 [(mm/kg.mm) × 10⁻⁷] | Crack occurence rate*2 (%) |
| --- | --- | --- | --- | --- |
| Ref. 2*5 | 82 | 15 | 50 | 75 |

*1 The conditions of wear testing were as follows;
(1) Test piece size: pin type: 10 mm ⌀ × 30 mm flat type: 30 mm × 50 mm × 5 mm
(2) The surface roughnesses of each type were 1.0 S.
(3) Lubricant; engine oil
*2 The crack testing was accomplished by thermal insertion of one end of a cylinder liner, the outer diameter size thereof being 137 mm, and a cast iron ring, the sizes thereof being 135 mm for the inner diameter, 148mm for the outer diameter and 250 mm for the thickness. The crack occurrence was judged by the naked eye.
*3 A hot pressed body formed of composition powder mixture and composed of three ring shaped bodies. The sizes of each ring shaped body were 140 mm for the outer diameter, 130 mm for the inner diameter and 100 mm in height. The hot pressing for forming and compositing the ring shaped bodies were prepared at a temperature of 1700° C. for 3 hours under a pressure of 350 kg/cm² in an atmosphere of nitrogen gas.
*4 The flexual strength at the composited section.
*5 A reaction sintered silicon nitride body which was produced by the steps of;
(1) Molding metal silicon powder, the mean particle size thereof being 1.6 microns and 5% by weight of paraffin added as a binder, and;
(2) Sintering at 1450° C. for 50 hours in an atmosphere of nitrogen gas.

Obviously, numerous modifications and variations of the present invention are possible in light of the above teaching. It is therefore to be understood that within the scope of the appended claims the invention may be practiced otherwise than as specifically described herein.

What is claimed as new and desired to be secured by letters patent of the United States is:

1. A free standing cylinder liner for use in an internal combustion engine comprising:

a sintered homogeneous ceramic mass of molded material having a density higher than 95% of theoretical density value of the material, a flexural strength greater than 50 kg/cm² at 800° C. and a randomly directed, homogeneous structure, wherein said material comprises a powdered raw material selected from the group consisting of silicon nitride, aluminum nitride, silicon oxynitride and silicon aluminum oxynitride which has been sintered in a furnace free from application of pressure thereon, wherein said sintered ceramic mass at least comprises silicon nitride.

* * * * *